Oct. 10, 1944. V. WEBER Re. 22,554
ELECTRICAL IGNITION SYSTEM FOR GASEOUS FUEL BURNERS
Original Filed May 7, 1941
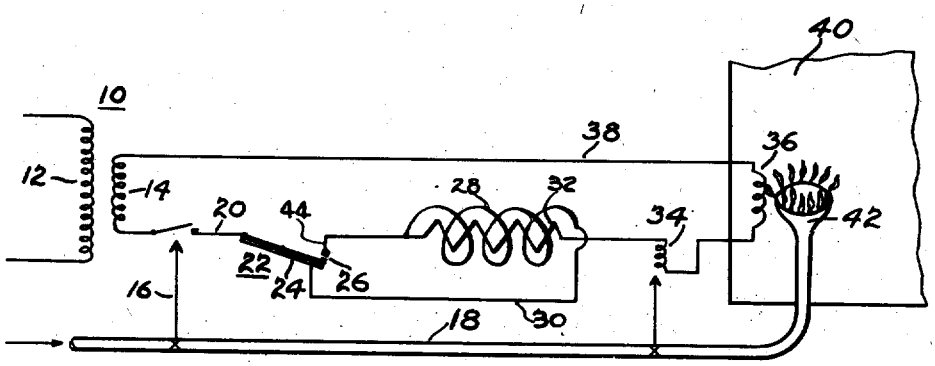
INVENTOR
VICTOR WEBER
BY Albert J. Henderson
ATTORNEY Reissued Oct. 10, 1944 Re. 22,554

UNITED STATES PATENT OFFICE 22,554

ELECTRICAL IGNITION SYSTEM FOR GASEOUS FUEL BURNERS

Victor Weber, Greensburg, Pa., assignor to Robertshaw Thermostat Company, Youngwood, Pa., a corporation of Pennsylvania Original No. 2,316,910, dated April 20, 1943, Serial No. 392,290, May 7, 1941. Application for reissue August 12, 1944, Serial No. 549,220

7 Claims. (Cl. 175—115)

This invention relates to ignition systems and, more particularly, to electrical ignition systems for gaseous fuel burners.

In systems employing electrically heated wires for ignition of a gaseous fuel burner, it is necessary to heat the wire to incandescence in order to obtain a flame at the burner. The line voltage of commercial current is subject to fluctuation in most localities and also varies between different sections of the country. Such variations obviously cause changes in the current supplied to the ignition device unless means are provided in the circuit of the secondary coil of the usual transformer to maintain substantially constant current flow and protect the ignition wire against excessive current values.

Resistors which increase in temperature with increases in the current, and thus increasing their resistance, are well known. It has been proposed to include such so-called ballast resistors in the circuit with the secondary coil of the usual transformer and in series with the ignition device, in order to regulate the current which flows to the igniter. In this manner, changes in the line voltage, causing changes in the current, are utilized to alter the resistivity of the ballast resistor to control the current in the circuit within relatively narrow limits.

It has been found, however, that the use of a ballast resistor to regulate the current results in high inrush current before the resistor can heat sufficiently. Although this inrush is of momentary duration, it may heat the igniter wire to a temperature close to the fusion point. Hence, while the regulation of the current by such devices is of considerable value, the disadvantage of the high inrush current detracts therefrom.

It is an object of this invention to regulate the current flow within close limits while preventing any inrush from reaching the ignition device.

Another object of this invention is to prevent continued flow of fuel upon failure of the electric circuit of the system or of the power supply.

Another object of the invention is to ensure satisfactory ignition of the fuel at the lowest voltage which may be encountered.

Another object of the invention is to increase the efficiency of the system without detracting from its simplicity.

Other objects and advantages will become apparent from the following description taken in connection with the accompanying drawing which shows a fuel burner and associated parts schematically in conjunction with a wiring diagram of the ignition circuit.

Referring more particularly to the drawing, the transformer 10 has its primary coil 12 connected to a source of commercial current supply which may vary between 95 volts and 125 volts. The secondary coil 14 of the transformer 10 receives current of varying voltage from the primary coil 12, the average of which may be either 6 volts or 12 volts, depending on the transformer used. One end of the coil 14 is connected to the terminal of a switch which, in this instance, may be carried by the operating handle of a thermostat 16 having a main valve controlling the flow of gaseous fuel through the conduit 18. The other terminal of the switch of the thermostat 16 carries a wire 20 connected to one terminal of a delayed action switch 22 which is open when the circuit is deenergized. In this embodiment of the invention the switch 22 is of the thermoresponsive type, comprising a bi-metal switch arm 24 adapted to warp when heated by energization of the circuit and make contact with the substantially fixed contact 26.

The bi-metal arm 24 is connected at all times with a resistance element 28 by means of a conductor 30. The resistance element 28 is of the type which does not change its resistivity when energized but which remains substantially constant. Connected in series with the constant resistance element 28 is a ballast resistor 32, an electromagnetic fuel valve 34 and an electric resistance igniting coil 36. A wire 38 completes the circuit from the igniting coil to the secondary coil of the transformer.

As shown in the drawing, the ballast resistor 32 is enclosed within the constant resistance element 28. This preferred embodiment of the invention increases the efficiency of the system by utilizing the ambient heat due to the constant resistance element 28 to bring the ballast resistor more rapidly to operating temperature. It will be apparent, however, that where this feature is not desired the two elements may be otherwise arranged as long as both remain connected in series with the secondary circuit of the transformer 10.

The igniting coil 36, in this embodiment, is positioned within the oven or other chamber of a domestic range, a portion of which is shown diagrammatically at 40. The conduit 18 conveys gaseous fuel from a source of supply to a burner 42 connected thereto and which may be positioned within the oven or other chamber 40 in position to be ignited by the igniting coil 36.

As previously mentioned herein, the ballast resistor 32 is adapted to vary its resistance with variations in the voltage of the line current and, consequently, in the secondary circuit described. Such variations in the supply voltage will be regulated by the ballast resistor and a substantially constant current will flow to the ignition coil during operation of the system.

This invention is more particularly directed toward the provision of means for protecting the ignition coil from the effects of high inrush current which may occur due to the use of the ballast resistor without reducing the amount of current available during normal operating conditions. To this end, the constant resistance element 28 is provided and serves to prevent the current surge from reaching the igniting coil 36. The resistance of the element 28 is, consequently, relatively high compared with that of the ballast resistor. It will be apparent, therefore, that when the inrush current has dropped to a safe value, the constant resistance element 28 has served its purpose and continued operation thereof would detract from the value of the current available in the secondary circuit for energizing the igniting coil 36.

In carrying out this feature of the invention means are provided to discontinue current flow through the constant resistance element 28 after the ballast resistor 32 becomes operative and the current surge due to its presence has ceased. This means comprises a wire 44 for the fixed terminal 26 of the delayed action switch 22 which connects to the end of the constant resistance 28 opposite the conductor 30 and places the switch 22 in parallel with the secondary circuit for shunting the resistance 28 at appropriate times.

The operation of the system is as follows: movement of the main switch 16 to closed position will cause the main fuel valve in conduit 18 to be opened. Current then flows through the secondary circuit by way of the wire 20, bi-metal arm 24, conductor 30, constant resistance element 28 and ballast resistor 32 to the electromagnetic valve 34. The solenoid of the electromagnetic valve 34 will be energized to open this valve and permit gas to flow to the burner 42. At the same time, the current will flow to the ignition coil 36 which will become incandescent and serve to ignite the fuel at the burner 42.

The high inrush current which may occur before the ballast resistor approaches operating temperature will not reach the igniter coil 36 due to the presence of the constant resistance element 28. After the expiration of a few seconds, the ballast resistor becomes sufficiently heated and thus operative to reduce any current variations in the secondary circuit due to variation in the supply voltage. During the time that the ballast resistor is becoming operative the bi-metal arm 24 of the delayed action switch 22 is simultaneously becoming heated and warping toward closed position with the fixed contact 26.

Thus, when the ballast resistor is fully operative and the current surge due to its presence in the circuit has ceased, then the delayed action switch 22 shunts out the constant resistance element 28 from the secondary circuit. A stabilized current of full voltage is thus available at the ignition coil 36 providing satisfactory operation of the system over long periods of time. Should the ignition coil fail, or the secondary circuit otherwise become deenergized, then the electromagnetic valve 34 will close to shut off the supply of fuel to the burner and insure safety under these conditions.

It will be apparent from the foregoing that the invention is not limited to the particular elements shown and described in connection with the system. The use of a bimetallic switch is merely illustrative and other types of delayed action units could obviously be substituted. This and other modifications could be made without departing from the spirit of the invention which generally consists in an arrangement capable of carrying out the objects of the invention set forth and in the combination defined in the appended claims.

I claim:

1. An electric ignition device for fuel burners having a source of current supply subject to voltage variation, an electric igniter adapted to be energized from said source, means in circuit with said igniter for reducing current variations through said igniter, said means producing high inrush current conditions before becoming operative, means in said circuit for preventing said inrush current from reaching said igniter, and means operable to discontinue current flow through the last said means after the first said means becomes operative.

2. An electric ignition device for fuel burners having a source of current supply subject to voltage variation, an electric igniter adapted to be energized from said source, a ballast resistor in circuit with said igniter for reducing current variations through said igniter, a constant resistance element in said circuit for preventing high inrush current due to the ballast resistor from reaching said igniter, and means operable to shunt said constant resistance after the ballast resistor becomes operative.

3. An electric ignition device for fuel burners having a source of current supply subject to voltage variation, an electric igniter adapted to be energized from said source, a ballast resistor in circuit with said igniter for reducing current variations through said igniter, a constant resistance element in said circuit for preventing high inrush current due to the ballast resistor from reaching said igniter, and switching means operable to shunt said constant resistance after the ballast resistor becomes operative.

4. An electric ignition device for fuel burners having a source of current supply subject to voltage variation, an electric igniter adapted to be energized from said source, a ballast resistor in circuit with said igniter for reducing current variations through said igniter, a constant resistance element in said circuit for preventing high inrush current due to the ballast resistor from reaching said igniter, and a normally open switch adapted to close and shunt said constant resistance after the ballast resistor becomes operative.

5. An electric ignition device for fuel burners having a source of current supply subject to voltage variation, an electric igniter adapted to be energized from said source, a ballast resistor in circuit with said igniter for reducing current variations through said igniter, a constant resistance element in said circut for preventing high inrush current due to the ballast resistor from reaching said igniter, and a delayed action switch connected across said resistance element, said switch being adapted to close after the ballast resistor becomes operative.

6. An electric ignition device for fuel burners having a source of current supply subject to voltage variation, an electric resistance igniting coil adapted to be energized in series with said source, an electromagnetic means in series with said igniting coil, a fuel valve actuated by the energization of the solenoid of said electromagnetic means to supply fuel to the igniting coil, a resistance coil in series with said igniting coil, said resistance coil having a high temperature coefficient of resistivity and being adapted to vary its resistance with variations in said supply voltage whereby said variations are reduced, a second resistance coil in series with said igniting coil having a substantially constant resistivity, said second coil being adapted to prevent high inrush current due to the first said coil from reaching said igniting coil, and a temperature responsive switch connected across said second resistance coil and being normally open, said switch being adapted to delay closing until after the first said resistance coil becomes operative.

7. An electric ignition device for fuel burners having a source of current supply subject to voltage variations, an electric igniter adapted to be energized from said source, a ballast resistor in circuit with said igniter for reducing current variations through said igniter, a constant resistance element in said circuit for preventing high inrush current due to the ballast resistor from reaching said igniter, said resistance element being in proximate relation to the ballast resistor to increase the ambient temperature therearound, and means operable to discontinue current flow through said resistance element after said ballast resistor becomes operative.

VICTOR WEBER.